(12) United States Patent
Zhang et al.

(10) Patent No.: US 10,156,497 B2
(45) Date of Patent: Dec. 18, 2018

(54) AUTOMOBILE BRAKE ASSEMBLY FATIGUE TEST STAND

(71) Applicant: JIANGSU UNIVERSITY OF SCIENCE AND TECHNOLOGY, Zhenjiang, Jiangsu (CN)

(72) Inventors: Jian Zhang, Jiangsu (CN); Wenxian Tang, Jiangsu (CN); Yongmei Zhu, Jiangsu (CN); Xuelong Tan, Jiangsu (CN); Yawei Liu, Jiangsu (CN); Ben Zhang, Jiangsu (CN); Rui Zhou, Jiangsu (CN); Qizhao Xu, Jiangsu (CN)

(73) Assignee: JIANGSU UNIVERSITY OF SCIENCE AND TECHNOLOGY, Zhenjiang, Jiangsu (CN)

( * ) Notice: Subject to any disclaimer, the term of this patent is extended or adjusted under 35 U.S.C. 154(b) by 113 days.

(21) Appl. No.: 15/523,747

(22) PCT Filed: Mar. 25, 2016

(86) PCT No.: PCT/CN2016/077378
§ 371 (c)(1),
(2) Date: May 2, 2017

(87) PCT Pub. No.: WO2017/016230
PCT Pub. Date: Feb. 2, 2017

(65) Prior Publication Data
US 2017/0328812 A1 Nov. 16, 2017

(30) Foreign Application Priority Data
Jul. 28, 2015 (CN) .......................... 2015 1 0452760

(51) Int. Cl.
*G01M 17/007* (2006.01)
*G01L 5/28* (2006.01)

(52) U.S. Cl.
CPC ............. *G01M 17/007* (2013.01); *G01L 5/28* (2013.01)

(58) Field of Classification Search
USPC ........................... 73/121, 128, 129, 130, 131
See application file for complete search history.

(56) References Cited

U.S. PATENT DOCUMENTS 3,602,042 A * 8/1971 Mitchell ................. G01L 5/282
73/126
5,537,865 A * 7/1996 Shultz ................... G01M 13/02
73/115.02

(Continued)

FOREIGN PATENT DOCUMENTS

CN 1945255 4/2007
CN 201402195 2/2010

(Continued)

OTHER PUBLICATIONS

International Search Report filed in PCT/CN2016/077378 dated Jul. 1, 2016.

*Primary Examiner* — Eric S McCall
(74) *Attorney, Agent, or Firm* — Rankin, Hill & Clark LLP

(57) ABSTRACT

The invention discloses an automobile brake assembly fatigue test stand, which includes a base and a thermotank, wherein a mandrel is mounted inside the thermotank, two ends of the mandrel are respectively inserted into a first taper sleeve and a second taper sleeve, the first taper sleeve is mounted inside a hollow brake tooling, one end of the brake tooling is connected with a first bearing pedestal casing, the other end of the brake tooling is connected with a brake, the first bearing pedestal casing is sequentially connected with a brake shaft, a static torque sensor and a support; the second taper sleeve is mounted inside a brake drum tooling through a bearing, one end of the brake drum tooling is connected (Continued)

with a brake drum sleeved on the mandrel while the other end is connected with a brake drum shaft, and the brake drum shaft is sequentially connected with a second bearing pedestal casing, a coupling, a reducer and a first servo motor. The mandrel is additionally mounted between two tooling fixtures, the tooling fixtures can freely rotate around the mandrel and support the two tooling fixtures, so that the rigidity of the tooling fixtures is enhanced, and the stability during testing is guaranteed.

7 Claims, 4 Drawing Sheets

(56) References Cited

U.S. PATENT DOCUMENTS

| | | | | |
|---|---|---|---|---|
| 6,116,084 | A * | 9/2000 | Fischer | G01M 17/022 |
| | | | | 73/146 |
| 6,382,020 | B1 * | 5/2002 | Fischer | G01M 17/022 |
| | | | | 73/146 |
| 2015/0040654 | A1 * | 2/2015 | Khateri | G01M 13/02 |
| | | | | 73/115.06 |

FOREIGN PATENT DOCUMENTS

| | | |
|---|---|---|
| CN | 102749205 | 10/2012 |
| CN | 203587353 | 5/2014 |
| CN | 204286807 | 4/2015 |
| CN | 104990713 | 10/2015 |
| DE | 4203926 | 8/1993 |

* cited by examiner

AUTOMOBILE BRAKE ASSEMBLY FATIGUE TEST STAND

TECHNICAL FIELD

The present invention relates to an automobile brake assembly fatigue test stand, which belongs to the field of vehicle testing technologies.

BACKGROUND

An automobile brake assembly is one of the important parts to ensure the safe driving of the automobile, which directly affects the parking reliability and driving safety of the automobile. While a automotive brake fatigue test stand is the key testing equipment for the automotive brake assembly.

A conventional automobile brake assembly fatigue test stand is mainly composed of four parts, including a base, a power source mechanism, a torque measuring mechanism and a brake assembly tooling fixture. Normally, the power source mechanism is fixed on the base, and the torque measuring mechanism can slide on guide rails. Taking a drum brake assembly for example, the working principle of the fatigue test stand is as follows: the brake drum is connected with a brake drum tooling and fixed on the power source mechanism, and the brake is connected with the brake tooling and fixed on the torque measuring mechanism. During a fatigue test, the torque measuring mechanism slides on the guide rails to a specified position, and the power source mechanism drives the brake drum to rotate. When braking, the torque measuring mechanism measures the actual braking torque during the braking process. However, the conventional fatigue test stand has several defects as follows: (1) during the testing process, sliding guide rails of the torque measuring mechanism are subjected to a torque repeatedly, if a common ball linear guide rail is selected, the guide rail is easily to be damaged, if a dovetail groove type guide rail is selected, a friction during moving is greater than that of the common ball linear guide rail, so that a motor having a greater power needs to be selected. (2) A brake tooling clamp and a brake drum tooling clamp are relatively independent, and equivalent to two cantilever beam structures, which greatly affect the rigidity performance of the tooling fixtures, and even cause a situation that the brake has been contacted with the brake drum without braking, so that the stability during the testing process is relatively poor. (3) The conventional fatigue test stand can only complete the fatigue test at a room temperature, but cannot complete fatigue tests of the brake at other temperature conditions.

The patent with an application No. 201420692146.2 discloses a brake assembly static torsional strength test tooling, the solution of which expands the universality of the test stand through exchanging the tooling, but does not solve the problem of affecting the rigidity performance of the tooling. The patent with an application No. 201320738681.2 discloses a pneumatic disc brake stand test tool. A mandrel is additionally arranged between two tooling fixtures, one end of the mandrel is provided with a bearing inserted into one of the toolings while the other end thereof is connected with the other tooling through a screw. As the mandrel needs to play a role of increasing the rigidity, tight fit is needed for inserting the bearing into the tooling, but this structure is not convenient to disassemble. In addition, a brake caliper in the patent is connected with the mandrel, and the mandrel is easily damaged by the braking torque.

SUMMARY

Object of the invention: in order to overcome the defects in the prior art, the present invention provides an automobile brake assembly fatigue test stand, wherein a mandrel is additionally arranged between two tooling fixtures, the tooling fixtures can freely rotate around a mandrel and support the two tooling fixtures, so that the rigidity of the tooling fixture is enhanced, and the stability during testing is guaranteed. During a braking test, the mandrel is not subjected to a braking torque, so that the service life of the mandrel is guaranteed.

Technical solution: in order to solve the above-mentioned technical problems, an automobile brake assembly fatigue test stand according to the present invention includes a base and a thermotank mounted on the base, wherein a mandrel is mounted inside the thermotank, two ends of the mandrel are respectively inserted into a first taper sleeve and a second taper sleeve, the first taper sleeve is mounted inside a hollow brake tooling, one end of the brake tooling is connected with a first bearing pedestal casing, the other end of the brake tooling is connected with a brake, the first bearing pedestal casing is sequentially connected with a brake shaft, a static torque sensor and a support, the first bearing pedestal casing, the brake shaft, the static torque sensor and the support are mounted on a sliding plate, the sliding plate is mounted on the base and is driven by a mobile device to move; the second taper sleeve is mounted inside a brake drum tooling through a bearing, one end of the brake drum tooling is connected with a brake drum sleeved on the mandrel while the other end is connected with a brake drum shaft, the brake drum shaft is sequentially connected with a second bearing pedestal casing, a coupling, a reducer and a first servo motor, and the first servo motor is connected with a controller.

Preferably, the mobile device includes a second servo motor and a linear sliding table, the linear sliding table is connected with the second servo motor, two sides of the linear sliding table are provided with linear guide rails, rail sliding blocks are mounted on the linear guide rails, the sliding plate is fixedly connected with the linear guide table and the rail sliding blocks, and the second servo motor drives the linear sliding tables to move, so as to drive the sliding plate to move.

Preferably, two sides of the sliding plate are both provided with a cylinder disc spring device, the cylinder disc spring device includes a guiding sleeve, a cylinder and a pressure barrel, the guiding sleeve is mounted on the sliding plate, the guiding sleeve is sequentially provided with a disc spring and the pressure barrel, a T-shaped bolt is sleeved in the disc spring, a head of the T-shaped bolt passes through the sliding plate and is located in a groove of the base, a tail of the T-shaped bolt is provided with a bolt, the pressure barrel is connected with the cylinder, the cylinder is fixed on a connecting plate of the guiding sleeve, the cylinder releases the T-shaped bolt by compressing the spring through the pressure barrel, then the sliding plate is unlocked; and the cylinder compresses the T-shaped bolt by releasing the spring through the pressure barrel, then the sliding plate is locked.

Preferably, a pair of fluency strips are mounted on the base, and the thermotank can move along the fluency strips.

Preferably, both the first taper sleeve and the second taper sleeve are provided with a taper hole, both two ends of the mandrel are in a taper shape adaptive to the taper hole, both the brake tooling and the brake drum tooling are provided with a step hole, one end of the first taper sleeve and one end of the second taper hole are positioned through the step holes respectively, the other end of the first taper sleeve and the other end of the second taper sleeve are limited through elastic collars, a pair of tapered roller bearings are sleeved on the second taper sleeve, a shaft sleeve is sleeved between two tapered roller bearings, one tapered roller bearing is positioned through the step hole, and the other tapered roller bearing is limited through the elastic collar.

Preferably, a temperature sensor is mounted in the thermotank, and the temperature sensor is connected with the controller.

Preferably, a wall of the thermotank is provided with a woof felt for sealing the brake drum shaft and the brake shaft.

Advantageous effects: the automobile brake assembly fatigue test stand according to the present invention has the following advantages.

(1) The ball linear guide rail and the cylinder disc spring mechanism are adopted; when needing to move, the cylinder presses the disc spring, and the T-shaped bolt is released, so that the friction is low when moving; during test, the cylinder is released, and the T-shaped bolt is locked under the force of the disc spring, so that the T-shaped bolt and the base bear most of the torque, thus reducing the force applied to the ball linear guide rail.

(2) The mandrel is additionally arranged between two tooling fixtures, the tooling fixtures can freely rotate around the mandrel, conical surface fit is adopted at a location fit position of the mandrel and the two tooling fixtures, to facilitate assembling and disassembling the mandrel; the mandrel supports the two tooling fixtures, so that the rigidity of the tooling fixture is enhanced, and the stability during testing is guaranteed. During a brake test, the mandrel is not subjected to a braking torque, so that the service life of the mandrel is guaranteed.

(3) The movable thermotank is arranged on the test stand, which can test the fatigue strength of the brake assembly at −40° C. to 200° C., so as to understand the fatigue performance of the brake at different temperatures and to help expand the application range of the brake. As the brake shaft and the brake drum shaft in the thermotank traverse the thermotank, the brake shaft and the brake drum shaft are clasped by two semicircular wool felts at an opening of the thermotank to increase the sealing, reduce the heat exchange inside and outside the thermotank, and ensure constant temperature in the thermotank; a temperature sensor is arranged in the thermotank, when the temperature reaches a given temperature, the temperature sensor and the control system control the running of the motor, so that a high test precision is obtained when performing fatigue test.

DETAILED DESCRIPTION

Figure 1:
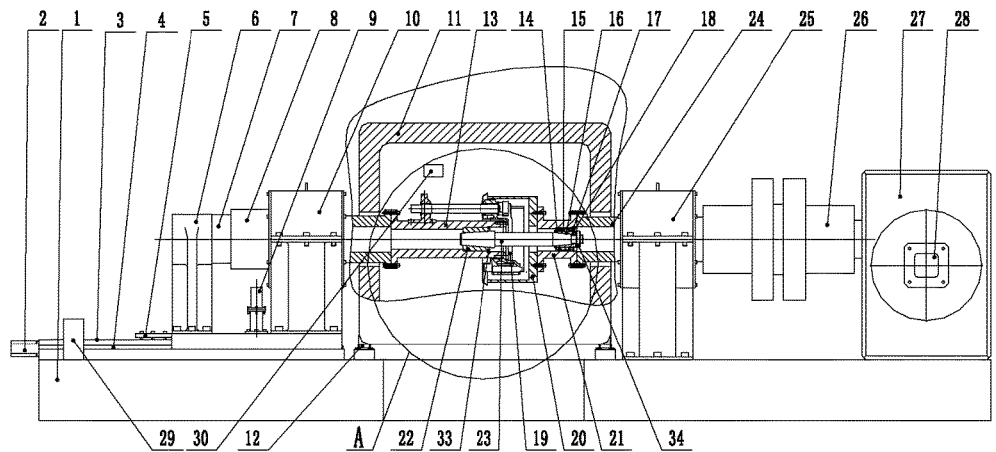
FIG. 1 is a front view of the present invention.
Figure 2:
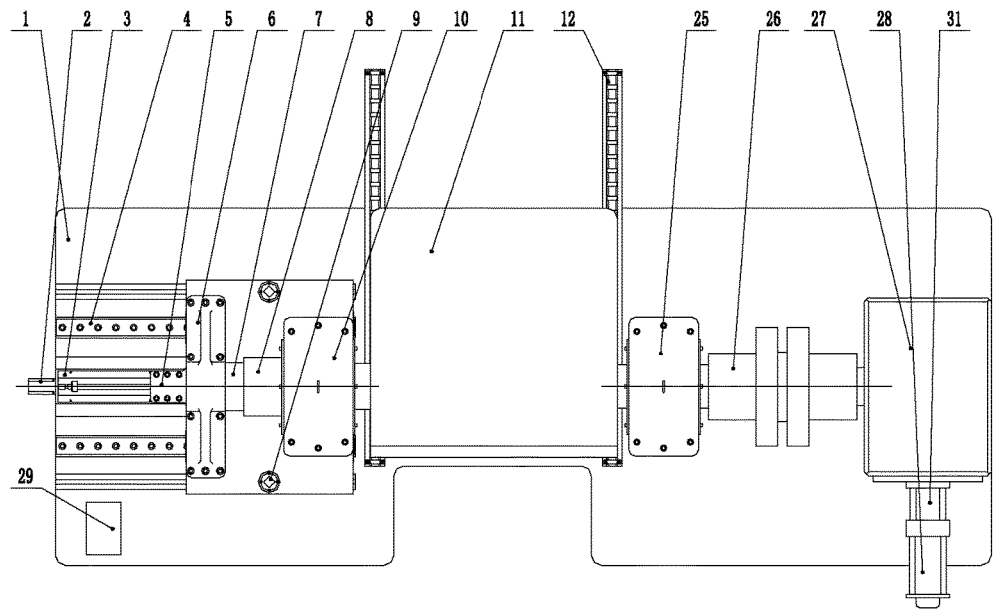
FIG. 2 is a top view of FIG. 1.

As shown in FIGS. 1 to 7, an automobile brake assembly fatigue test stand of the present invention includes a base 1, a second servo motor 2 is arranged on the base 1, the second servo motor 2 is connected with a linear sliding table 3, two sides of the linear sliding table 3 are provided with linear guide rails 4, the linear guide rails 4 are connected with guide rail sliding blocks 32, the guide rail sliding blocks 32 are connected with a sliding plate 5 through a screw, the linear sliding table 3 is connected with the sliding plate 5 through a screw, a support 6 is arranged on the sliding plate 5, the support 6 is connected with a static torque sensor 7, the static torque sensor 7 is connected with a brake shaft 8, the brake shaft 8 is arranged on a bearing pedestal casing 10, two sides of the sliding plate 5 are provide with cylinder disc spring devices 9, one end of the brake shaft 8 is provided with a flange and is connected with a brake tooling 13 through a screw, the other end of the brake tooling 13 is connected with a brake 19 through a screw, the brake tooling 13 is a hollow shaft structure, a first taper sleeve 22 is arranged inside one end of the brake tooling connected with the brake 19, one end of the first taper sleeve 22 is positioned by a shaft step, while the other end is limited by a first elastic collar 33, a first servo motor 28 is further arranged on the base 1, the first servo motor 28 is connected with a primary reducer 31, the primary reducer 31 is connected with a secondary reducer 27, an output shaft of the secondary reducer 27 is connected with a coupling 26, the other end of the coupling 26 is connected with a brake drum shaft 24, the brake drum shaft 24 is arranged on a second bearing pedestal casing 25, the other end of the brake drum shaft 24 is provided with a flange and is connected with a brake drum tooling 21 through a screw, the other end of the brake drum tooling 21 is connected with a brake drum 20 through a screw, the brake drum tooling 21 is a hollow mandrel structure, two tapered roller bearings 14 are arranged in the brake drum tooling 21, the two tapered roller bearings 14 are separated through a shaft sleeve 15, one end of a component composed by the two tapered roller bearings 14 and the shaft sleeve 15 is positioned by the shaft step, while the other end of the component is positioned by a first elastic collar 17, a second taper sleeve 16 is arranged in an internal ring of the tapered roller bearing 14, one end of the second taper sleeve 16 is provided with a shaft step for positioning, while the other end of the second taper sleeve is positioned by a second elastic collar 18, a mandrel 23 is arranged between the brake tooling 13 and the brake drum tooling 21, one end of the mandrel 23 is inserted into the second taper sleeve 16, while the other end of the mandrel is inserted into the first taper sleeve 22, the end inserted into the second taper sleeve 16 is locked and positioned by a retaining collar 34 and a round nut, the brake tooling 13, the brake 19, the brake drum tooling 21, the brake drum 20 and the mandrel 23 are all arranged in the thermotank 11, the thermotank 11 is arranged on a fluency strip 12 arranged on the base 1, the thermotank 11 is internally provided with a temperature sensor 30, and a wall of the thermotank is provided with a woof felt for sealing the brake drum shaft and the brake shaft.

Figure 3:
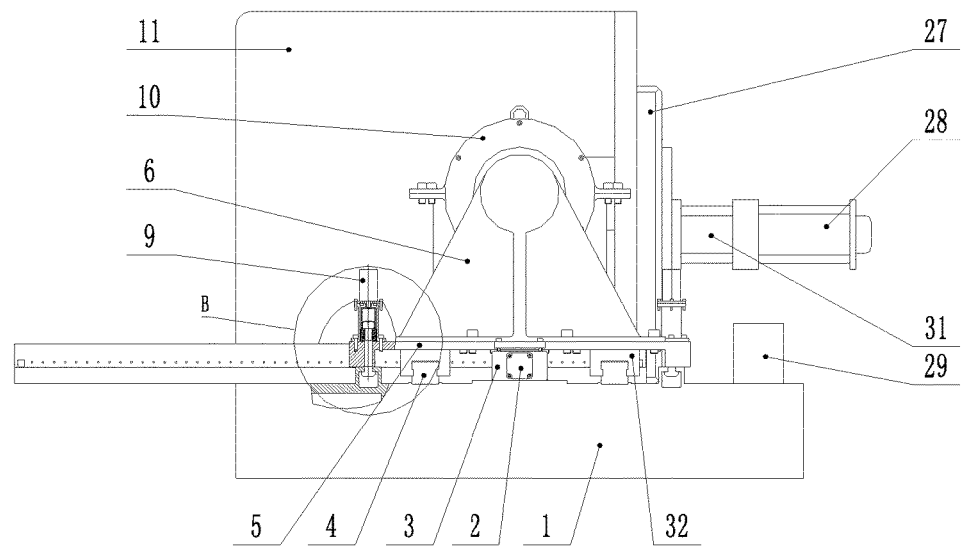
FIG. 3 is a left view of FIG. 1.
Figure 4:
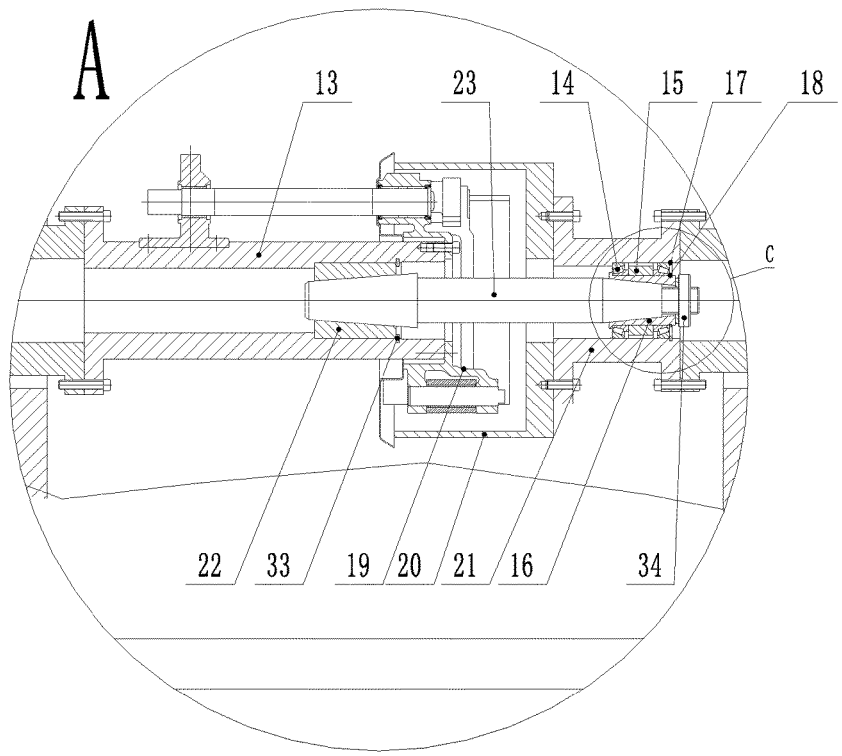
FIG. 4 is a locally amplified diagram of FIG. 1.
Figure 5:
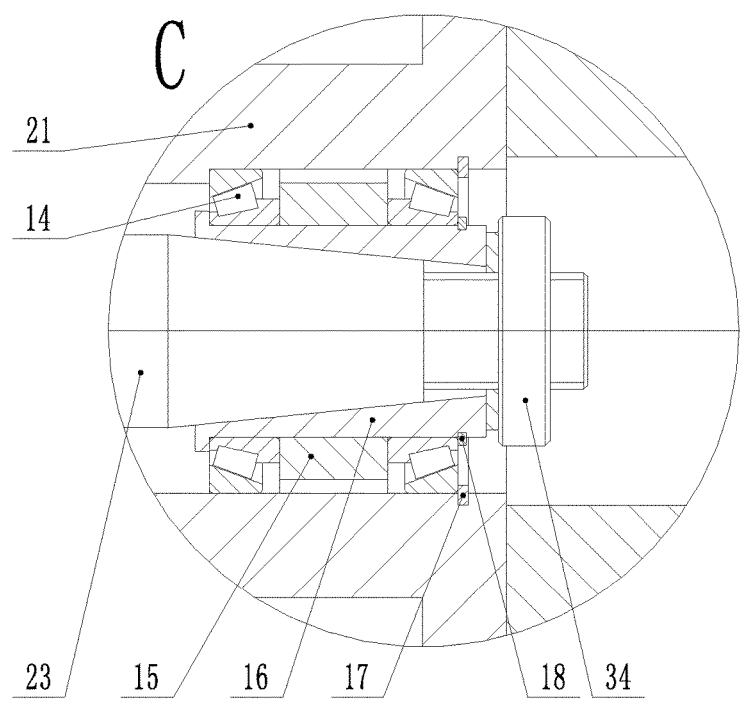
FIG. 5 is a locally amplified diagram of FIG. 4.
Figure 6:
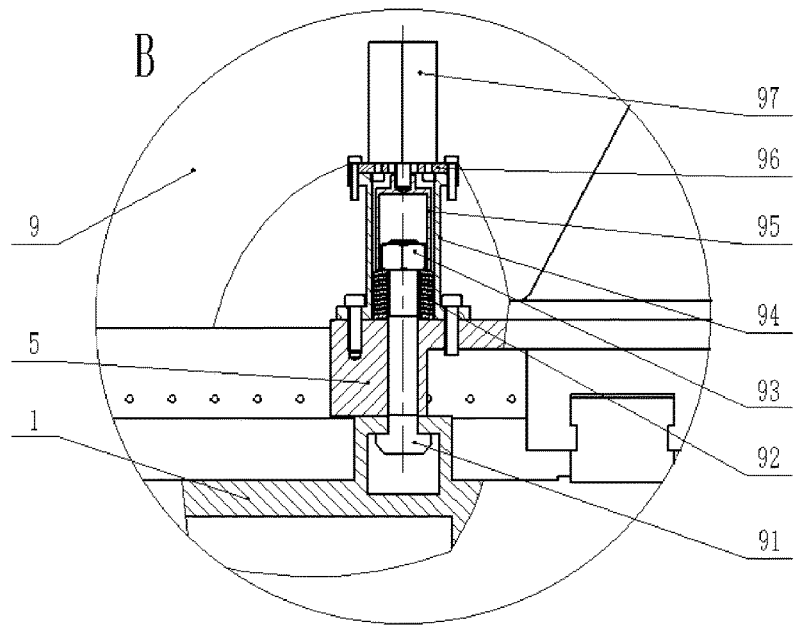
FIG. 6 is a locally amplified diagram of FIG. 3.

As shown in FIG. 3 and FIG. 6, a groove is arranged on the base 1, a T-shaped bolt 91 is embedded in the groove on the base 1 and passes through a U-shaped groove on the sliding plate 5, the T-shaped bolt 91 is sleeved with a disc spring 92, the disc spring 92 is tightly pressed by a nut 93, a pressure barrel 95 is arranged above the disc spring, guiding sleeves 94 are arranged on external rings of the disc spring 92 and the pressure barrel 95, one end of the guiding sleeve is connected with the sliding plate 5 through a screw, while the other end is connected with a connecting plate 96 through a screw, a cylinder 97 is arranged on the connecting plate 96, and the pressure barrel 95 is connected with the cylinder 97 through a screw thread.

Figure 7:
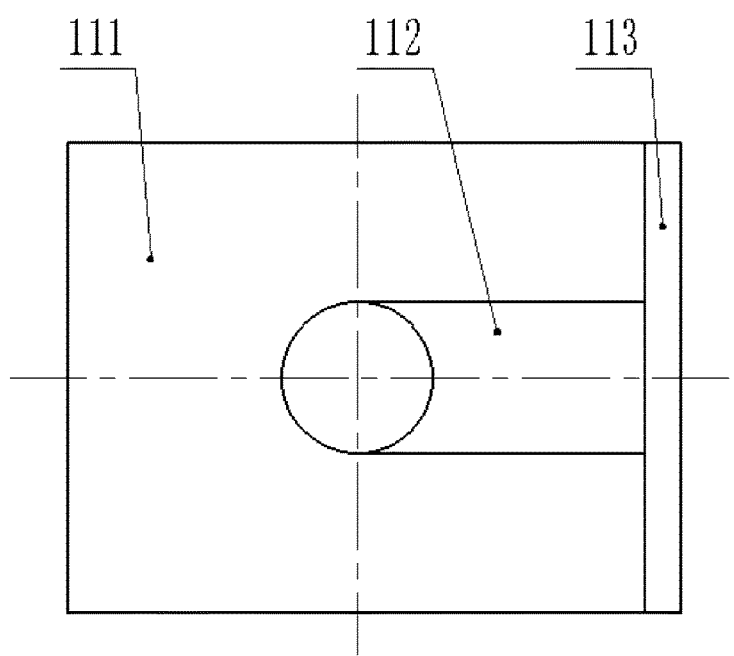
FIG. 7 is a left view of a thermotank;
wherein, 1 refers to base, 2 refers to second servo motor, 3 refers to linear sliding table, 4 refers to linear guide rail, 5 refers to sliding plate, 6 refers to support, 7 refers to a static torque sensor, 8 refers to brake shaft, 9 refers to cylinder disc spring device, 10 refers to bearing pedestal casing A, 11 refers to thermotank, 12 refers to fluency strip, 13 refers to brake tooling, 14 refers to tapered roller bearing, 15 refers to shaft sleeve, 16 refers to second taper sleeve, 17 refers to first elastic collar, 18 refers to second elastic collar, 19 refers to brake, 20 refers to brake drum, 21 refers to brake drum tooling, 22 refers to first taper sleeve, 23 refers to mandrel, 24 refers to brake drum shaft, 25 refers to second bearing pedestal casing, 26 refers to coupling, 27 refers to secondary reducer, 28 refers to first servo motor, 29 refers to control system, 30 refers to temperature sensor, 31 refers to primary reducer, 32 refers to guide rail sliding block, 33 refers to first elastic collar, 34 refers to retaining collar, 91 refers to T-shaped bolt, 92 refers to disc spring, 93 refers to nut, 94 refers to guiding sleeve, 95 refers to pressure barrel, 96 refers to connecting plate, 97 refers to cylinder, 111 refers to thermotank body, 112 refers to thermotank side plate, and 113 refers to thermotank cover plate.

As shown in FIG. 7, the thermotank 11 is composed of a thermotank body 111, a thermotank side plate 112 and a thermotank cover plate 113, the thermotank side plate 112 and the thermotank cover plate 113 can be disassembled, when the thermotank needs to be withdrawn, the thermotank side plate 112 and the thermotank cover plate 113 are disassembled, and the thermotank body 111 can be moved on the fluency strip 12 to withdraw. During test, the thermotank body 111 is moved on the fluency strip 12 to a specified position to assemble with the thermotank side plate 112 and the thermotank cover plate 113 as a whole to perform the fatigue test.

In the embodiment, the sliding plate 5 can slide on the linear guide rail 4, the support 6 is fixed on the sliding plate through a screw, the rotation freedom of the static torque sensor 7 and the brake shaft 8 is restrained by the support 6, when the sliding plate 5 moves, the cylinder 97 is pushed forwards to compress the disc spring 92, and a clearance is generated between the T-shaped bolt 91 and the base 1. As the T-shaped bolt 91 is embedded in the groove of the base 1, the sliding plate 5 can drive the T-shaped bolt 91 to move along a grooving direction together in case that the friction is low. When the sliding plate 5 moves to a specified position, the cylinder 97 is retracted, a force produced by the disc spring 92 enables the T-shaped bolt 91 to closely contact with the base 1, and a large portion of torque applied to the brake 19 during the braking process is transferred onto the T-shaped bolt 91 and the base 1, so as to reduce the force applied to the linear guide rail 4.

One end of the mandrel 23 is matched with the second taper sleeve 16 in the brake drum tooling 21 and is locked and positioned by the retaining collar 34 and the round nut, while the other end of the mandrel is inserted into the first taper sleeve 22. During the test, the brake drum tooling 13 can rotate around the mandrel 23 freely due to the presence of the tapered roller bearing 14, so that the mandrel 23 plays a role of increasing the rigidity of the brake tooling 13 and the brake drum tooling 21.

When a fatigue test of the brake assembly is needed, the thermotank 11 is withdrawn along the fluency strip 12 firstly, the cylinder 97 is pushed forwards to compress the disc spring 92, the control system 29 controls the second servo motor 2 to pull the sliding plate to an initial position through the linear sliding table 3, the cylinder 97 is retracted, and the disc spring 92 drives the T-shaped bolt 91 to lock. The brake tooling 13, the brake 19, the brake drum tooling 21, the brake drum 20 and the mandrel 23 are mounted. Secondly, the cylinder 97 is pushed forwards, the T-shaped bolt 91 is released, the control system 29 controls the first servo motor to rotate, the sliding plate 5 is pushed to a given position through the linear sliding table 3, the cylinder 97 retracts to lock the T-shaped bolt 91, the thermotank 11 is fixedly mounted and works; when the temperature in the thermotank 11 reaches a given temperature, the temperature sensor 30 transmits a signal to the control system 29, the control system 29 controls the first servo motor 28 to rotate to perform the fatigue test. When braking, the brake 19 works, and the static torque sensor 7 can measure the actual braking torque during the braking process.

The above only describes the preferred embodiment of the invention. It should be noted that those having ordinary skills in the art may also make many improvements and polishing without departing from the principle of the invention, which shall all be deemed as the protection scope of the invention.

The invention claimed is:

1. An automobile brake assembly fatigue test stand, comprising a base and a thermotank mounted on the base, wherein a mandrel is mounted inside the thermotank, two ends of the mandrel are respectively inserted into a first taper sleeve and a second taper sleeve, the first taper sleeve is mounted inside a hollow brake tooling, one end of the brake tooling is connected with a first bearing pedestal casing, the other end of the brake tooling is connected with a brake, the first bearing pedestal casing is sequentially connected with a brake shaft, a static torque sensor and a support, the first bearing pedestal casing, the brake shaft, the static torque sensor and the support are mounted on a sliding plate, the sliding plate is mounted on the base and is driven by a mobile device to move; the second taper sleeve is arranged inside a brake drum tooling through a bearing, one end of the brake drum tooling is connected with a brake drum sleeved on the mandrel while the other end is connected with a brake drum shaft, the brake drum shaft is sequentially connected with a second bearing pedestal casing, a coupling, a reducer and a first servo motor, and the first servo motor is connected with a controller.

2. The automobile brake assembly fatigue test stand according to claim 1, wherein the mobile device comprises a second servo motor and a linear sliding table, the linear sliding table is connected with the second servo motor, two sides of the linear sliding table are provided with linear guide rails, rail sliding blocks are mounted on the linear guide rails, the sliding plate is fixedly connected with the linear guide table and the rail sliding blocks, and the second servo motor drives the linear sliding tables to move, so as to drive the sliding plate to move.

3. The automobile brake assembly fatigue test stand according to claim 2, wherein two sides of the sliding plate are both provided with a cylinder disc spring device, the cylinder disc spring device comprises a guiding sleeve, a cylinder and a pressure barrel, the guiding sleeve is mounted on the sliding plate, the guiding sleeve is sequentially provided with a disc spring and the pressure barrel, a T-shaped bolt is sleeved inside the disc spring, a head of the T-shaped bolt passes through the sliding plate and is located in a groove of the base, a tail of the T-shaped bolt is provided with a bolt, the pressure barrel is connected with the cylinder, the cylinder is fixed on a connecting plate of the guiding sleeve, the cylinder releases the T-shaped bolt by compressing the spring through the pressure barrel, then the sliding plate is unlocked; and the cylinder compresses the T-shaped bolt by releasing the spring through the pressure barrel, then the sliding plate is locked.

4. The automobile brake assembly fatigue test stand according to claim 3, wherein a pair of fluency strips are mounted on the base, and the thermotank can move along the fluency strips.

5. The automobile brake assembly fatigue test stand according to claim 4, wherein both the first taper sleeve and the second taper sleeve are provided with a taper hole, two ends of the mandrel are both in a taper shape adaptive to the taper hole, both the brake tooling and the brake drum tooling are provided with a step hole, one end of the first taper sleeve and one end of the second taper hole are positioned through the step holes respectively, the other end of the first taper sleeve and the other end of the second taper sleeve are limited through elastic collars, a pair of tapered roller bearings are sleeved on the second taper sleeve, a shaft sleeve is sleeved between the two tapered roller bearings, one tapered roller bearing is positioned through the step hole, and the other tapered roller bearing is limited through the elastic collar.

6. The automobile brake assembly fatigue test stand according to claim 5, wherein a temperature sensor is mounted in the thermotank, and the temperature sensor is connected with the controller.

7. The automobile brake assembly fatigue test stand according to claim 5, wherein a wall of the thermotank is provided with a woof felt for sealing the brake drum shaft and the brake shaft.

* * * * *